(12) United States Patent
Bryant, Jr. et al.

(10) Patent No.: US 11,931,981 B2
(45) Date of Patent: Mar. 19, 2024

(54) REINFORCED COMPOSITE BLADE AND METHOD OF MAKING A BLADE

(71) Applicant: General Electric Company, Schenectady, NY (US)

(72) Inventors: Gary Willard Bryant, Jr., Loveland, OH (US); Phani Nandula, Bangalore (IN)

(73) Assignee: General Electric Company, Schenectady, NY (US)

(*) Notice: Subject to any disclaimer, the term of this patent is extended or adjusted under 35 U.S.C. 154(b) by 10 days.

(21) Appl. No.: 15/882,044

(22) Filed: Jan. 29, 2018

(65) Prior Publication Data
US 2019/0234420 A1 Aug. 1, 2019

(51) Int. Cl.
*B29D 99/00* (2010.01)
*B29C 70/22* (2006.01)
(Continued)

(52) U.S. Cl.
CPC ........ *B29D 99/0025* (2013.01); *B29C 70/302* (2021.05); *B32B 3/14* (2013.01); *B32B 5/12* (2013.01); *B32B 5/26* (2013.01); *B32B 27/08* (2013.01); *F01D 5/282* (2013.01); *F04D 29/388* (2013.01); *B29C 70/228* (2013.01); *B29K 2307/04* (2013.01); *B29K 2309/08* (2013.01); *B29L 2031/08* (2013.01); *B32B 2262/101* (2013.01); *B32B 2262/106* (2013.01);
(Continued)

(58) Field of Classification Search
CPC ............ F04D 29/388; F04D 2240/303; B29L 2031/08; B29C 70/30; F01D 5/14; F01D 5/28; F01D 5/147; F01D 5/282; F01D 5/288; F05D 2300/603; F05D 2300/6034; B32B 3/00–30; B32B 5/12
See application file for complete search history.

(56) References Cited

U.S. PATENT DOCUMENTS 4,051,289 A * 9/1977 Adamson ................ B29C 70/08
428/113
5,375,978 A * 12/1994 Evans ...................... B64C 11/26
416/224
(Continued)

FOREIGN PATENT DOCUMENTS

EP 0526057 A1 7/1992
EP 2781734 B1 3/2013
(Continued)

OTHER PUBLICATIONS

Canadian Office Action Corresponding to Application No. 3030334 dated Dec. 17, 2019.
(Continued)

*Primary Examiner* — Christopher Verdier
*Assistant Examiner* — Michael K. Reitz
(74) *Attorney, Agent, or Firm* — Dority & Manning, P.A.

(57) ABSTRACT

A blade is provided. The blade comprises a plurality of a first composite fiber plies and a plurality of a second composite fiber plies. Ends of the second fiber plies are staggered such that interlock between the first composite fiber plies and the second composite fiber plies is formed in a region where the second composite fiber plies end and meet with the first composite fiber plies. The blades are used for an engine of an aircraft.

18 Claims, 9 Drawing Sheets

(51) Int. Cl.
*B29C 70/30* (2006.01)
*B29L 31/08* (2006.01)
*B32B 3/14* (2006.01)
*B32B 5/12* (2006.01)
*B32B 5/26* (2006.01)
*B32B 27/08* (2006.01)
*F01D 5/28* (2006.01)
*F04D 29/38* (2006.01)
*B29K 307/04* (2006.01)
*B29K 309/08* (2006.01)
*B64D 27/16* (2006.01)
*B64D 33/02* (2006.01)

(52) U.S. Cl.
CPC .......... *B32B 2603/00* (2013.01); *B64D 27/16* (2013.01); *B64D 33/02* (2013.01); *B64D 2033/022* (2013.01); *F05D 2220/36* (2013.01); *F05D 2300/6034* (2013.01)

(56) References Cited

U.S. PATENT DOCUMENTS

| | | |
|---|---|---|
| 5,965,240 A | 10/1999 | Blackburn |
| 7,575,417 B2 * | 8/2009 | Finn ................ F01D 5/147 |
| | | 416/230 |
| 8,100,662 B2 | 1/2012 | Schreiber |
| 8,382,440 B2 | 2/2013 | Baker et al. |
| 8,475,135 B2 | 7/2013 | Kuroiwa et al. |
| 8,647,070 B2 | 2/2014 | Jevons |
| 9,249,684 B2 | 2/2016 | Lazur et al. |
| 9,376,917 B2 * | 6/2016 | Murooka ................ F01D 5/28 |
| 9,879,541 B2 | 1/2018 | Torgard |
| 10,245,792 B2 | 4/2019 | Collis et al. |
| 10,450,870 B2 | 10/2019 | Nandula et al. |
| 2009/0165924 A1 * | 7/2009 | Steibel ................ F01D 5/147 |
| | | 156/89.11 |
| 2013/0064676 A1 | 3/2013 | Salisbury et al. |
| 2013/0330496 A1 | 12/2013 | Kray et al. |
| 2015/0240659 A1 | 8/2015 | Thornburgh |
| 2016/0032939 A1 | 2/2016 | Anderson et al. |
| 2016/0250812 A1 | 9/2016 | Roach et al. |
| 2016/0362990 A1 | 12/2016 | Kray et al. |
| 2017/0037738 A1 | 2/2017 | Marin |
| 2018/0045207 A1 * | 2/2018 | Paquin ................ B32B 5/12 |

FOREIGN PATENT DOCUMENTS

| | | |
|---|---|---|
| EP | 3205827 A1 | 2/2017 |
| WO | WO2010/065928 A1 | 6/2010 |

OTHER PUBLICATIONS

European Search Report Corresponding to U.S. Appl. No. 19/153,804 dated May 3, 2019.

* cited by examiner

REINFORCED COMPOSITE BLADE AND METHOD OF MAKING A BLADE

BACKGROUND OF THE INVENTION

The present disclosure relates generally to blades and, more particularly, to reinforced composite blades and methods of making such reinforced composite blades.

It is well known in the art that carbon composite material has several advantages such as high stiffness, high strength, low weight, high chemical resistance, high temperature tolerance and low thermal expansion. These properties have made carbon composite fibers popular and advanced in many fields including aerospace, civil engineering, military and motorsports. However, carbon composite fibers are relatively expensive when compared with other fibers, such as glass fibers or plastic fibers.

Due to their advantageous properties, carbon composite fibers are usually laid on some portions of engine blades of aircraft such as the tip portion of blade, trailing and/or leading edges of blade, sometimes even the entire surface of blade, which allows the blades to be designed with required stiffness and strength.

Figure 1:
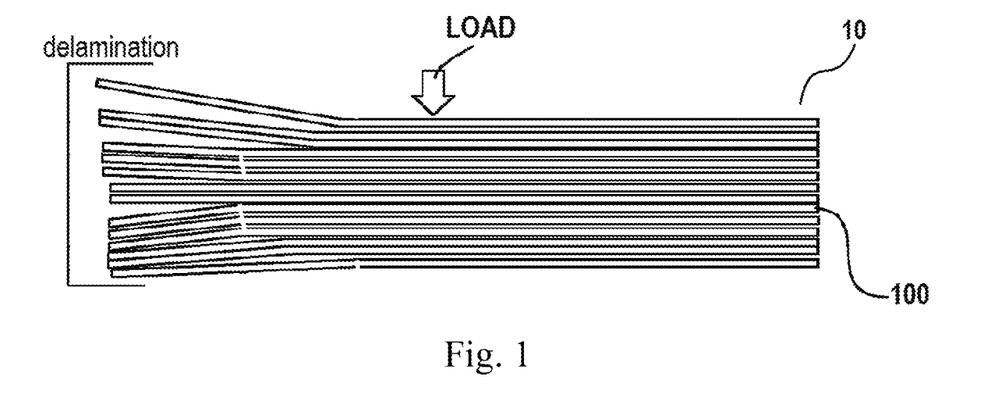
FIG. 1 is a schematic representation of the delamination of carbon composite fiber layers in the prior art when the load is applied on blade.

During a flight when a large object like a bird strikes a composite blade of an aircraft, such as a fan blade, there will be potential for unserviceable damage to the blade which could lead to the loss of engine performance. When a bird strike happens, the blade will experience large bending deformations, which causes large strains to occur in the carbon composite fibers. In a carbon composite fibers fan blade, this can lead to delamination or fiber failure of the carbon composite fibers. Bird strike events will generate interlaminar shear and through-thickness direct stresses in the free edges of the blade, especially at or approaching the leading edge and trailing edge of the blade. As shown in FIG. 1, when load is applied on the blade 10, the load can lead to delamination of carbon composite fiber layers 100 at free edges. Furthermore, the delamination can develop quickly from the free edges (i.e. trailing edge or leading edge) of blades and propagate rapidly throughout the blades. Thus, only carbon composite fibers applied on the blades require additional thickness to prevent the high strain resulting from bending deformations induced by the external impacts like bird strike.

The present disclosure intends to obtain a blade with high stiffness and high strength as well as the ability of withstanding high strain which is not easily to be delaminated when external impacts like interlaminar shear and/or through-thickness direct stresses are applied to the blade. In this way, stronger, thinner, lighter and fewer blades will enhance the airflow and make for a lighter and more efficient blade fan that will improve the aircraft engine's overall performance and fuel burn.

BRIEF DESCRIPTION OF THE INVENTION

The present disclosure discloses one or more of the features recited in the appended claims and/or the following features which, alone or in any combination, may comprise patentable subject matter.

In one embodiment, the present disclosure intends to provide a blade which comprises a plurality of a first composite fiber plies and a plurality of a second composite fiber plies, wherein ends of the second composite fiber plies are staggered such that interlock between the first composite fiber plies and the second composite fiber plies is formed in a region where the second composite fiber plies end and meet with the first composite fiber plies.

In another embodiment, the present disclosure aims to provide an engine of an aircraft, the engine comprises a blade. The blade comprises a plurality of a first composite fiber plies and a plurality of a second composite fiber plies, wherein ends of the second composite fiber plies are staggered such that interlock between the first composite fiber plies and the second composite fiber plies is formed in a region where the second composite fiber plies end and meet with the first composite fiber plies.

In further embodiment, the present disclosure excepts to provide a method of making a blade. The method comprises laying a plurality of first composite fiber plies on the blade, and laying a plurality of second composite fiber plies in combination with the plurality of the first composite fiber plies to make ends of the second composite fiber plies be staggered such that interlock between the first composite fiber plies and the second composite fiber plies is formed in a region where the second composite fiber plies end and meet with the first composite fiber plies.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Repeat use of reference characters in the present specification and drawings is intended to represent the same or analogous features or elements of the present disclosure.

DETAILED DESCRIPTION OF THE INVENTION

Reference now will be made in detail to embodiments of the disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In order to clearly describe the present disclosure, it will become necessary to select certain terminology when referring to and describing relevant portions of a blade. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that what may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. The term "radially" refers to the relative direction that is substantially perpendicular to an axial centerline of a particular component and/or substantially perpendicular to an axial centerline of an engine of an aircraft, and the term "axially" refers to the relative direction that is substantially parallel and/or coaxially aligned to an axial centerline of a particular component and/or to an axial centerline of an engine of an aircraft, and the term "circumferentially" refers to the relative direction that is substantially parallel to the circumference of a particular component and/or substantially parallel to an annular casing element of an engine of an aircraft. As used herein, the terms of "inward" and "inwardly" indicate a tendency from surface of component toward interior of component, and the terms of "outward" and "outwardly" indicate a tendency from interior of component toward surface of component. The terms "leading" and "trailing", without any further specificity, refer to directions, with "leading" referring to the front or forward end of the blade, and "trailing" referring to the rearward or aft end of the blade. The term "spanwise" indicates a direction extending from a root of blade to a tip of blade. The term "chordwise" indicates a direction extending from a leading edge of blade to a trailing edge of blade. As used herein, the terms "first", "second", and "third" may be used interchangeably to distinguish one component from another and are not intended to signify location, importance of the individual components, or specific blade frequencies.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 2:
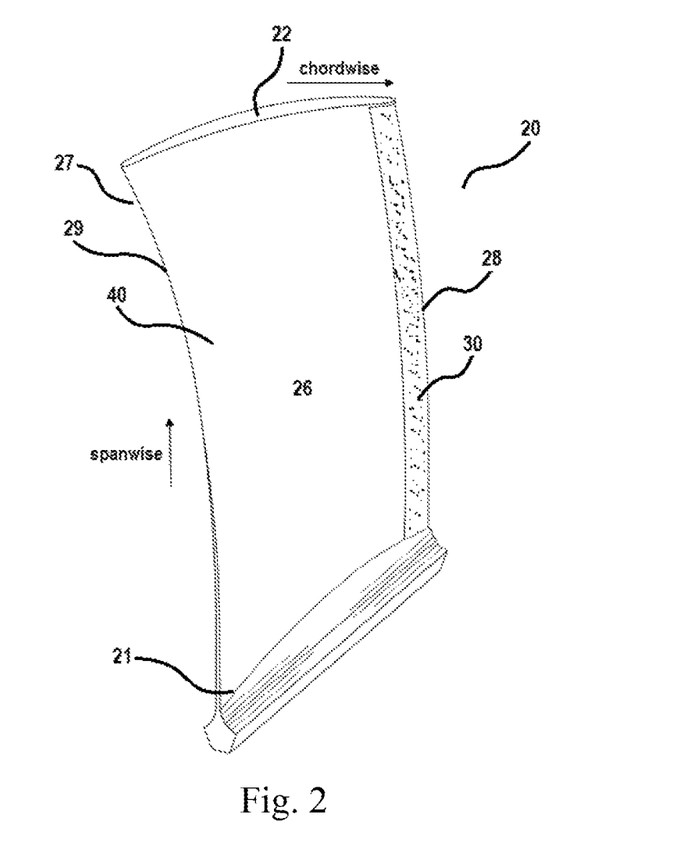
FIG. 2 is a perspective view of a fan blade according to an embodiment of the invention.

FIG. 2 shows a blade in an embodiment of the invention. More particularly, the blade shown in FIG. 2 can be employed in gas turbines of aircrafts. In addition, the present disclosure as shown and described herein is not limited to be used in an aero engine (turbine), a land based and/or industrial turbine unless otherwise specified in the claims can incorporate the blades as described herein as well.

As shown in FIG. 2, blade 20 can be a fan blade which includes a root 21 by which blade 20 attaches to a rotor disc and a tip 22 opposite to root 21. It will be seen that blade 20 includes a concave pressure side 26 and an opposite convex suction side 27 extending in chordwise direction from the leading edge 28 to the trailing edge 29 respectively. Also, concave pressure side 26 and convex suction side 27 extend in spanwise direction from root 21 to tip 22 respectively. It could be appreciated that concave pressure side 26 has a first surface and convex suction side 27 has a second surface.

Blade 20 comprises a plurality of first composite fiber plies 40 and a plurality of second composite fiber plies 30, and the second composite fiber plies prone to suffering from high strain. More particularly, the second composite fiber plies 30 are disposed at the leading edge 28 of the blade 20 in this embodiment. Optionally, the second composite fiber plies 30 can be disposed at the trailing edge 29 of the fan blade 20 in another embodiment. Alternatively, the second composite fiber plies 30 are disposed at both of the leading edge 28 and the trailing edge 29 of the fan blade 20 in further embodiment. The first composite fiber plies 40 extend in chordwise direction from the leading edge 28 to the trailing edge 29 and in spanwise direction from the root 21 to the tip 22.

The first composite fiber plies can use carbon fibers since they have comparatively high stiffness and strength. However, if the blade has the first composite fiber plies (for example, carbon fiber plies) only, it is not sufficient for the blade to resist the high strain induced by bending deformations coming from the external load during the bird strike. Thus, a supplementary of the second composite fiber plies 30 (for example, glass, aramid, polymer, basalt fiber plies or a combination thereof) in combination with the first composite fiber plies 40 can make up for the incapability of resisting the high strain. The glass composite fibers have the ability of withstanding higher strain to failure compared to carbon composite fibers. The second composite fiber plies can select various kinds of fibers with high strain resistance. Preferably, the second composite fibers can be glass fibers.

Figure 3:
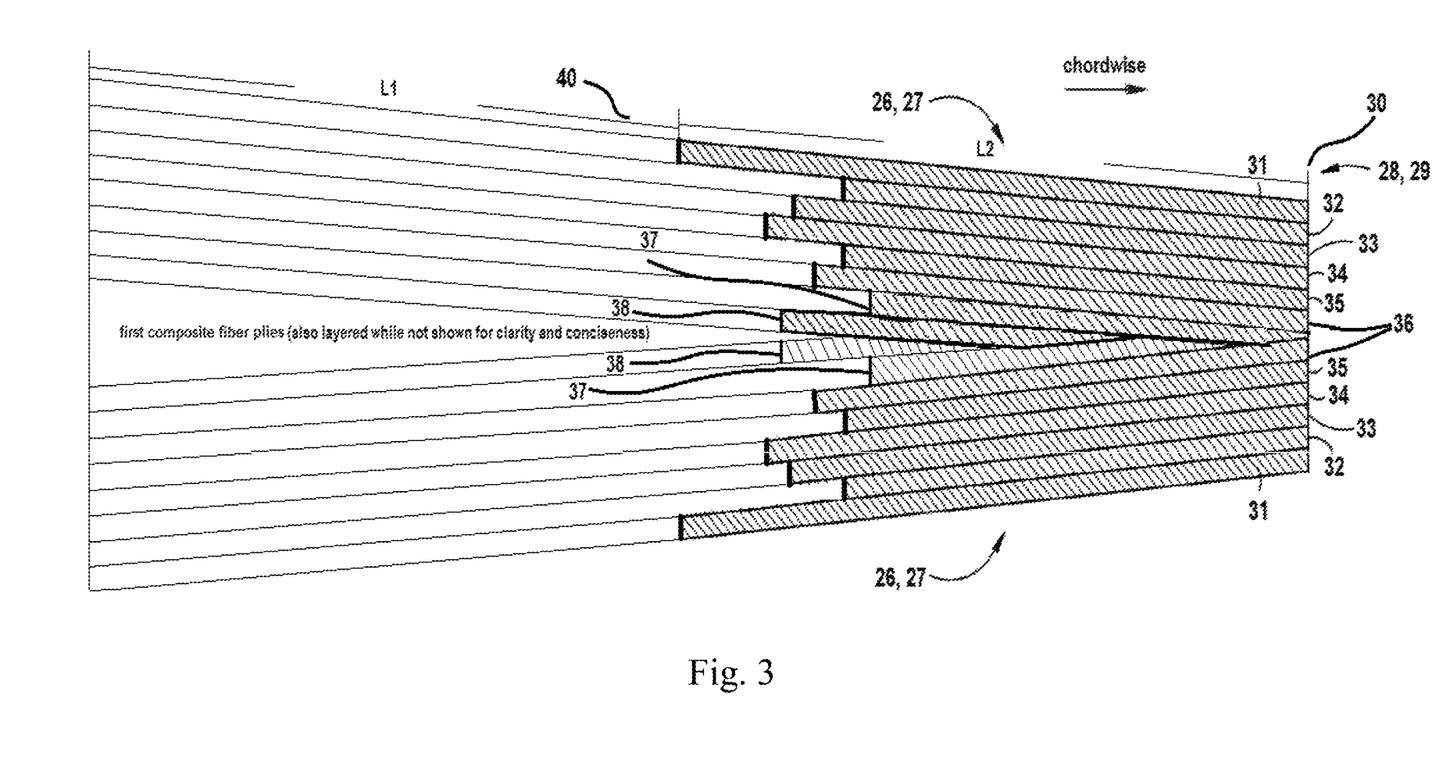
FIG. 3 is an illustrative cross-sectional view of a leading or a trailing edge of a blade according to an embodiment of the invention.

FIG. 3 shows a leading or a trailing edge of a blade in an embodiment of the invention in an illustrative cross-sectional view. Referring to FIG. 3, a plurality of second composite fiber plies 30 are used to provide the leading edge 28 or the trailing edge 29 with more strain-resistance protection. In one embodiment, a plurality of the second composite fiber plies 30 comprise spanwise fiber plies 31, 33, 35 decreasing both in chordwise length and in spanwise length monotonically from surface of the blade inwardly. In another embodiment, a plurality of the second composite fiber plies 30 comprise non-spanwise fiber plies 32, 34, 36 not monotonically decreasing or increasing from surface of the blade inwardly.

Figure 4:
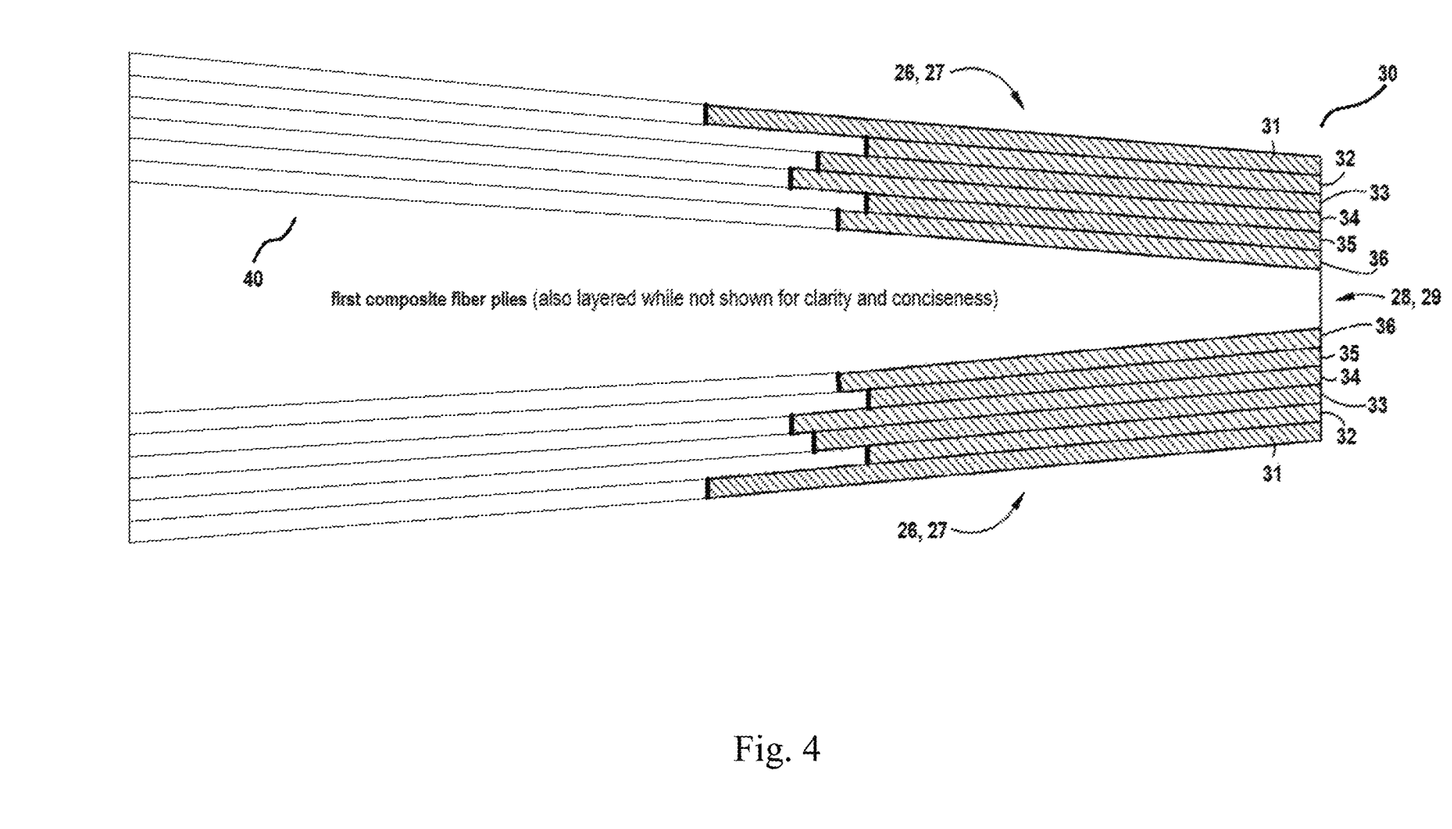
FIG. 4 is an illustrative cross-sectional view of a leading or a trailing edge of a blade according to another embodiment of the invention.

In further embodiment, a plurality of the second composite fiber plies comprise spanwise fiber plies decreasing both in chordwise length and in spanwise length monotonically from surface of the blade inwardly and non-spanwise fiber plies not monotonically decreasing or increasing from surface of the blade inwardly. More particularly, the second composite fiber plies 30 comprise first spanwise fiber ply 31, first non-spanwise fiber ply 32, second spanwise fiber ply 33, second non-spanwise fiber ply 34, third spanwise fiber ply 35, third non-spanwise fiber ply 36, fourth spanwise fiber ply 37 and fourth non-spanwise fiber ply 38 extending from leading edge towards trailing edge (or from trailing edge towards leading edge) and extending from the surfaces 26, 27 inwardly. The spanwise fiber plies including first spanwise fiber ply 31, second spanwise fiber ply 33, third spanwise fiber ply 35, and fourth spanwise fiber ply 37. These spanwise fiber plies have fibers arranged in spanwise direction, which means the fibers in the spanwise fiber plies have 0° relative to the spanwise direction of the blade 20. In another word, the fibers in these spanwise fiber plies are oriented in a direction parallel to the spanwise direction of the blade 20. The non-spanwise fiber plies including first non-spanwise fiber ply 32, second non-spanwise fiber ply 34, third non-spanwise fiber ply 36, and fourth non-spanwise fiber ply 38. These non-spanwise fiber plies have fibers arranged at an angle relative to the spanwise direction of the blade 20. The selection of the angle of fibers in non-spanwise fiber plies will be discussed in the following description accompanying with FIGS. 9-11. As shown in FIG. 3, there are eight second composite fiber plies laid on surfaces 26, 27. However, the number of the second composite fiber plies of blade 20 is merely for purposes of illustration and discussion and is not intended to limitation. Those of ordinary skill in the art, using the disclosures provided herein, shall understand that the number of the second composite fiber plies and/or the first composite fiber plies of blade 20 can be adjusted without deviating from the scope of the present disclosure. In one example, there are six second composite fiber plies laid on both surfaces 26, 27, as depicted in FIG. 4. Or, there are more than eight second composite fiber plies laid on both surfaces 26, 27. In another example, the number of second composite fiber plies laid on one of surfaces 26, 27 could be less or more than that of the other one of surfaces 26, 27, which means the number of the first composite fiber plies and/or the second composite fiber plies laid on the surface 26 is different from that laid on surface 27. More particularly, there are eight second composite fiber plies laid on one of surfaces 26, 27, while there are ten second composite fiber plies laid on the other one of surfaces 26, 27.

Referring to FIG. 3, the first composite fiber plies 40 (for example, carbon fiber plies) do not extend to the end of leading edge and/or the end of trailing edge, which means the leading edge or trailing edge has the second composite fiber plies only, for example, glass fiber plies. The thickness of blade tapers from middle portion of blade to edge portion of blade. That is, the thickness of blade is thicker in the middle portion while is thinner in the edge portions (including the leading edge and trailing edge) since no carbon fiber layers exists in these portions. The number of glass fiber plies applied leads to the amount of chordwise length where the portion of leading edge or the portion of trailing edge is entirely covered by glass fiber plies. The more glass fiber plies are added, the more portion of the trailing edge or the leading edge becomes entirely-glass. In this manner, the trailing edge or the leading edge of the blade could withstand the highest strain during a bird impact since the glass fiber plies have higher strain to failure than that of carbon fiber plies, such that the trailing edge or the leading edge with entirely-glass fiber plies offers an improved bird-strike capability.

Those fibers in one individual ply go or substantively go in one direction are called unidirectional fibers. On the opposite, those fibers in one individual ply go in different directions are called non-unidirectional fibers. Preferably, the second composite fiber plies 30 are made of unidirectional fibers since the unidirectional fibers have better property (i.e. higher strength) than that of non-unidirectional fibers and could withstand higher load compared to the non-unidirectional fibers.

FIG. 4 shows a leading or a trailing edge of a blade according to another embodiment of the invention in an illustrative cross-sectional view. As depicted in FIG. 4, a plurality of second composite fiber plies 30 are used to provide the leading edge 28 or the trailing edge 29 with more strain-resistance protection. The second composite fiber plies 30 comprise first spanwise fiber ply 31, first non-spanwise fiber ply 32, second spanwise fiber ply 33, second non-spanwise fiber ply 34, third spanwise fiber ply 35, and third non-spanwise fiber ply 36, extending from leading edge towards trailing edge (or from trailing edge towards leading edge) and extending from the surfaces 26, 27 inwardly. The spanwise fiber plies including first spanwise fiber ply 31, second spanwise fiber ply 33, and third spanwise fiber ply 35. These spanwise fiber plies have fibers arranged in spanwise direction, which means the fibers in the spanwise fiber plies have 0° relative to the spanwise direction of the blade 20. In another word, the fibers in these spanwise fiber plies are oriented in a direction parallel to the spanwise direction of the blade 20. The non-spanwise fiber plies including first non-spanwise fiber ply 32, second non-spanwise fiber ply 34, and third non-spanwise fiber ply 36. Different from the first composite fiber plies shown in FIG. 3, the first composite fiber plies 40 extend to the end of leading edge and/or the end of trailing edge. In this way, the second composite fiber plies and the first composite fiber plies are both present in the leading edge and/or trailing edge.

Figure 5:
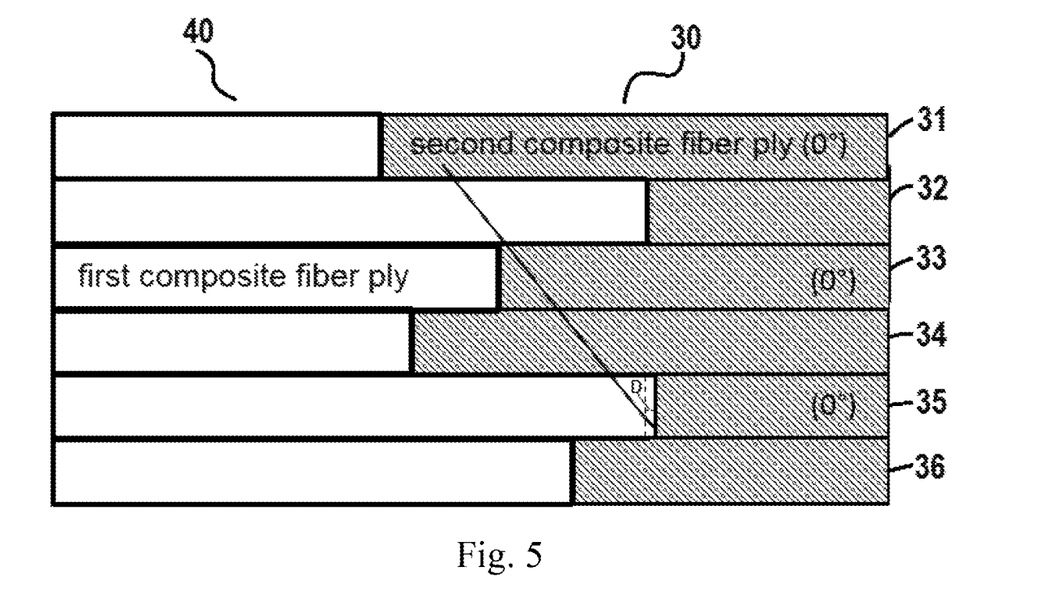
FIG. 5 illustratively shows an enlarged cross-sectional view of a leading or a trailing edge of a blade according to an embodiment of the invention.

FIG. 5 shows an enlarged cross-sectional view of a leading or a trailing edge of a blade. As shown in FIGS. 3 and 4, the non-spanwise fiber plies 32, 34 are arranged between two adjacent spanwise fiber plies 31, 33, 35. This means the two adjacent spanwise fiber plies are spaced by one non-spanwise fiber ply. In the same manner, the two adjacent non-spanwise fiber plies are spaced by one spanwise fiber ply as well. For instance, first spanwise fiber ply 31 and second spanwise fiber ply 33 is spaced by first non-spanwise fiber ply 32.

FIG. 5 illustratively shows ends of the second composite fiber plies are staggered in chordwise direction of the blade (FIG. 4 also shows). In chordwise direction, ends of first spanwise fiber ply 31, first non-spanwise fiber ply 32, second spanwise fiber ply 33, second non-spanwise fiber ply 34, third spanwise fiber ply 35, and third non-spanwise fiber ply 36 are staggered so as to form interlock between the first composite fiber plies and the second composite fiber plies, thereby to prevent the plural adjacent second composite fiber plies (i.e. two or more than two adjacent second composite fiber plies) end at the same spot.

Figure 6:
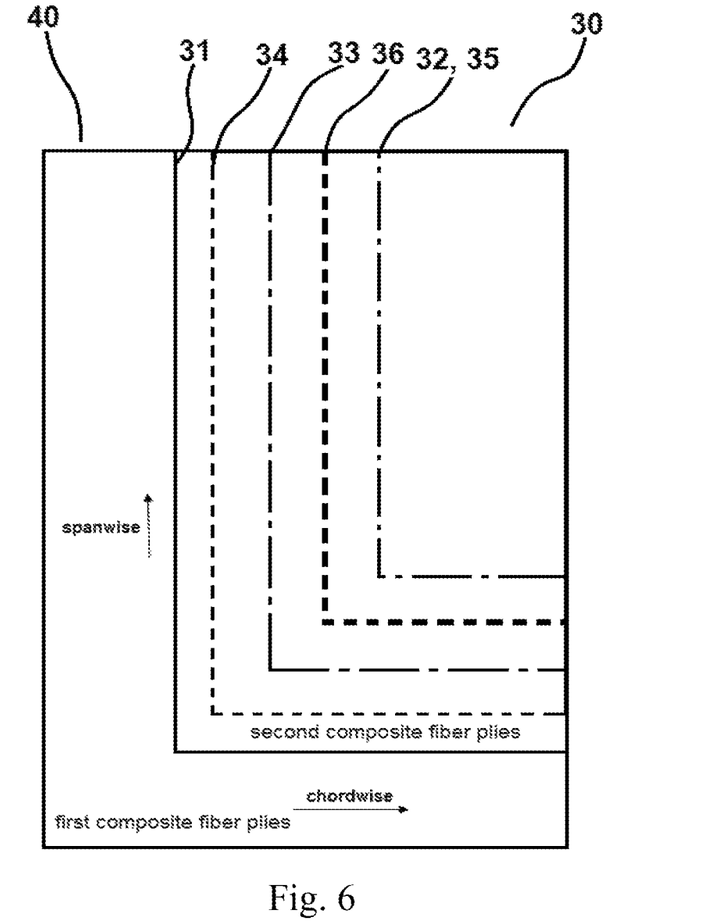
FIG. 6 partly and illustratively shows view of surface of a leading or a trailing edge of a blade according to an embodiment of the invention.

FIG. 6 illustratively shows ends of the second composite fiber plies are staggered in spanwise direction of the blade according to an embodiment of the invention. Referring to FIG. 6, the second composite fiber plies 30 could be disposed at the leading edge or the trailing edge of the blade, and each of the second composite fiber plies is a part of one whole layer of blade. In one whole layer of blade, the first composite fiber ply and the second composite fiber ply are two separate pieces, but they are combined together to form one whole layer. In spanwise direction, ends of first spanwise fiber ply 31, first non-spanwise fiber ply 32, second spanwise fiber ply 33, second non-spanwise fiber ply 34, third spanwise fiber ply 35, and third non-spanwise fiber ply 36 are also staggered so as to form interlock between the first composite fiber plies 40 and the second composite fiber plies 30, thereby to prevent the plural adjacent second composite fiber plies (i.e. two or more than two adjacent second composite fiber plies) end at the same spot. Except for first spanwise fiber ply 31 being represented in solid line, the other second composite fiber plies 32, 33, 34, 35, 36 are represented in broken lines such as dotted line and dot-dash line. It is noted that the smallest rectangle area represents two second composite fiber plies 32, 35, wherein one is first non-spanwise fiber ply 32, and the other is third spanwise fiber ply 35 though first non-spanwise fiber ply 32 and third spanwise fiber ply 35 are overlapped in one area in FIG. 6.

As shown in FIGS. 5 and 6, the second composite fiber plies end differently both in chordwise direction and in spanwise direction creating a staggered pattern. The interlock depends how the second composite fiber plies end. The interlock used herein actually is formed in a region where the material transition from one to another, for example, from all carbon to carbon and glass, and then to all glass. There will be a quick change in material properties in this region. The ends of the second composite fiber plies are designed to be staggered in chordwise direction and/or in spanwise direction of the blade which is beneficial to smooth such material transition. Thus, such interlock will stop the second composite fiber plies and/or the first composite fiber plies from delamination.

Figure 7:
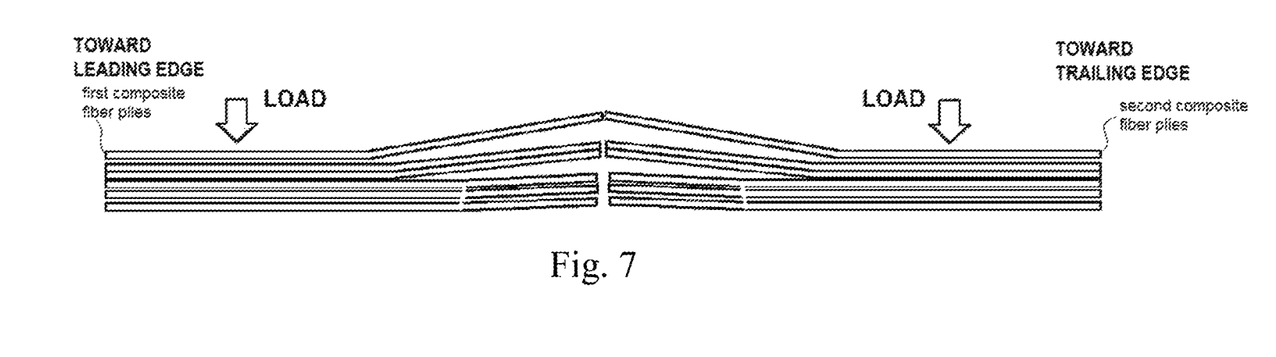
FIG. 7 is a schematic representation of the delamination of first composite fiber plies and second composite fiber plies when the load is applied on them.

FIG. 7 shows the delamination of first composite fiber plies and second composite fiber plies when the load is applied on them. As shown in FIG. 7, ends of all six second composite fiber plies are aligned, namely, they all end at the same or the substantially same spot, which will create a local strength weakness, leading to the disengagement of the first composite fiber plies and the second composite fiber plies while causing delamination between the plies of the first composite fiber plies and delamination between the plies of second composite fiber plies. It could be well understood that it also could create a local strength weakness if only two or three adjacent second composite fiber plies, rather than all six second composite fiber plies, end at the same or the substantially same spot.

In consideration of the overall second composite fiber plies, length of second composite fiber plies changes irregularly. Chordwise length used herein means the length size of second composite fiber ply or first composite fiber ply extending from leading edge 28 to trailing edge 29. Spanwise length used herein means the length size of second composite fiber ply or first composite fiber ply extending from root 21 to tip 22.

In consideration of the spanwise fiber plies of the second composite fiber plies only, lengths of spanwise fiber plies change regularly, that is, chordwise length and spanwise length of spanwise fiber plies decrease monotonically from first surface inwardly. As shown in FIG. 5, chordwise length and spanwise length of first spanwise fiber ply 31, second spanwise fiber ply 33 and third spanwise fiber ply 35 decrease successively (along the solid slash in FIG. 5) from surface toward interior. In consideration of the non-spanwise fiber plies only, lengths of non-spanwise fiber plies do not decrease or increase monotonically from surface toward interior. Namely, neither chordwise length nor spanwise length of non-spanwise fiber plies decreases or increases monotonically from surface toward interior.

Figure 8:
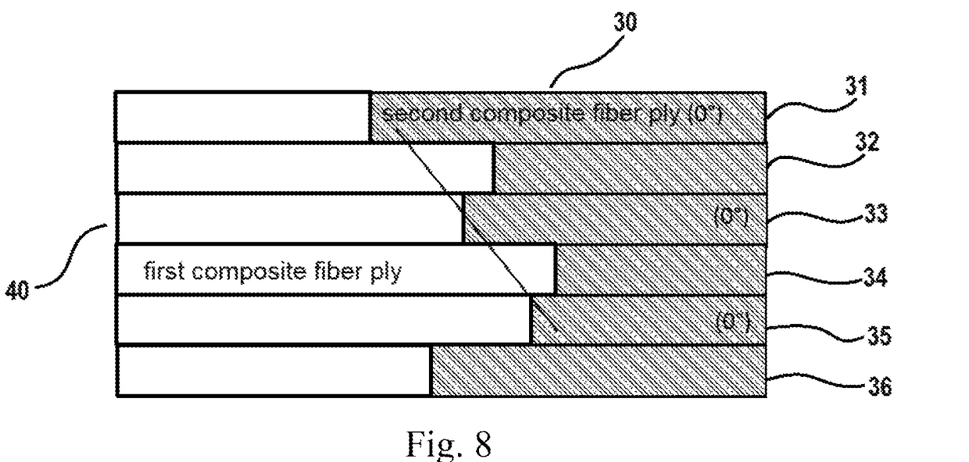
FIG. 8 is an enlarged and partial cross-sectional view of a leading or a trailing edge of a blade according to another embodiment of the invention.

FIG. 8 is an enlarged and partial cross-sectional view of a leading or a trailing edge of a blade in another embodiment of the invention. As shown in FIG. 8, blade comprises a plurality of first composite fiber plies and a plurality of second composite fiber plies. The first composite fiber plies and the second composite fiber plies are configured in the similar way as those shown in FIG. 5. The chordwise length of first spanwise fiber ply 31, second spanwise fiber ply 33 and third spanwise fiber ply 35 decreases successively (along the solid slash). Meanwhile, spanwise length of first spanwise fiber ply 31, second spanwise fiber ply 33 and third spanwise fiber ply 35 are also decreases successively from surface toward interior (not shown in Figures but similar to what is represented in FIG. 6). While the chordwise length and spanwise length of non-spanwise fiber plies 32, 34 and 36 do not decrease or increase monotonically from surface toward interior either.

Figure 9:
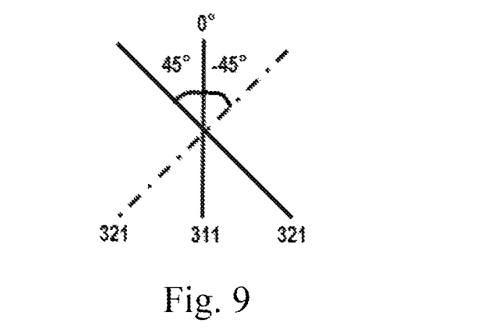
FIGS. 9-11 illustratively show the orientation of fibers in the non-spanwise fiber plies and in the spanwise fiber plies when they are manufactured into a plurality of second composite fiber plies.
Figure 10:
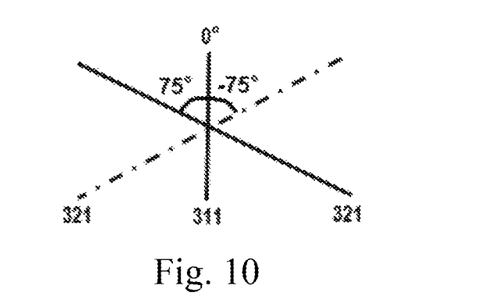
Figure 11:
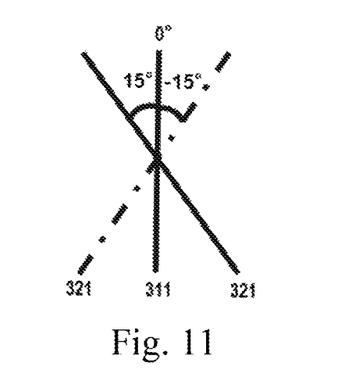

FIGS. 9-11 show the orientation of fibers in the non-spanwise fiber plies and in the spanwise fiber plies when they are manufactured together. Referring to FIG. 9 along with FIGS. 4 and 5, first spanwise fiber ply 31 has fibers 311 which are parallel to the spanwise direction of the blade (0° relative to the spanwise direction of the blade). The first non-spanwise fiber ply 32 adjacently disposed below the first spanwise fiber ply 31 has fibers 321 which are oriented at an angle of 45° relative to the spanwise direction of the blade (shown with the solid line). As an alternative, the first non-spanwise fiber ply can also has fibers 321 which are oriented at an angle of −45° relative to the spanwise direction of the blade (shown with the dashed line). Optionally, as shown in FIG. 10, the first non-spanwise fiber ply has fibers 321 which are oriented at an angle of 75° relative to the spanwise direction of the blade (shown with the solid line), or has fibers 321 are oriented at an angle of −75° relative to the spanwise direction of the blade (shown with the dashed line). Alternatively, as shown in FIG. 11, the first non-spanwise fiber ply has fibers 321 which are oriented at an angle of 15° relative to the spanwise direction of the blade (shown with the solid line), or has fibers 321 are oriented at an angle of −15° relative to the spanwise direction of the blade (shown with the dashed line). Typically, the fibers woven in the first non-spanwise fiber ply can be oriented at an angle ranging from ±15° to ±75° relative to spanwise direction of the blade.

Optionally, the first non-spanwise fiber ply could have fibers oriented at angle of 45°, the second non-spanwise fiber ply could have fibers oriented at angle of 15° (or 30°), and the third non-spanwise fiber ply could have fibers oriented at angle of 75° (or 60°). Hence, the whole second composite fiber ply system has different fibers oriented in different directions which is beneficial to improve the strength and stiffness of the system. The spanwise fiber plies takes the majority of load since they are oriented parallel to the spanwise direction of the blade. The external load comes from multiple directions. If the fibers of all the plies run in only one direction, it would be strong in that direction, but will actually result in strength weakness in the other directions. The configuration of the fibers in non-spanwise fiber plies in other directions makes the fibers between the adjacent plies of the second composite fiber ply system cross to form an angle. This helps in preventing the strength weakness generated in the second composite fiber ply system, thereby enhancing the strength and stiffness of the system. As shown in FIGS. 9-11, fibers 321 of the first non-spanwise fiber ply is just for illustration not for limitation. That is, the fibers oriented at an angle between ±15° and ±75° (for example, ±20°, ±30°, ±40°, ±45°, ±50°, ±60°, ±70°, or ±75°) relative to spanwise direction of the blade can be applied to any other non-spanwise fiber plies, for instance, second or third non-spanwise fiber ply.

Referring to FIG. 3-5 again, it can be seen that the first non-spanwise fiber ply 32 and the third spanwise fiber ply 35 end at the same spot or substantively end at a same spot. However, the first non-spanwise fiber ply 32 and the third spanwise fiber ply 35 are separated by the second spanwise fiber ply 33 and the second non-spanwise fiber ply 34 (two plies), which avoid two adjacent fiber plies end at same spot, thereby reducing the possibility of forming local strength weakness. However, it also works when at least one ply is disposed between two adjacent second composite fiber plies ending at the same spot or at the substantively same spot.

It is optimal that no more than two plies of a plurality of the second composite fiber plies end at a same spot or substantively end at a same spot. In one embodiment, no more than two plies of a plurality of the second composite fiber plies end at a same spot or substantively end at a same spot both in chordwise direction and in spanwise direction. As shown in FIG. 5, two plies substantively end at a same or substantively same spot means that the length (for example, the chordwise length or the spanwise length) of two plies 32, 35 differs within ±100 mil (the difference D ranges from −100 mil to 100 mil). In another embodiment, no more than two plies 32, 35 of a plurality of the second composite fiber plies end at the substantively same spot differ (the difference D) within 20 times of an average thickness of one ply of the second composite fiber plies.

Continuing to FIG. 3, only a small amount of second composite fiber plies (i.e. glass plies) will not be enough to provide ability to resist the high strain at the trailing edge of blade. In an optional way, chordwise length L1 of each of a plurality of the first composite fiber plies 40 accounts for 50% to 99% of the whole chordwise length of the blade, and chordwise length L2 of each of a plurality of the second composite fiber plies 30 accounts for 1% to 50% of the whole chordwise length of the blade. Chordwise length used herein means the length size of second composite fiber ply or first composite fiber ply extending from leading edge to trailing edge.

Edge thickness of the blade is made up of entirely second composite fiber plies (i.e. glass fiber plies) accounting for 1% to 50% of the whole chordwise length of the blade. The blade thickness tapers in the manner of being thicker in the middle of the blade to being thinner on the edge of the blade. The number of second composite fiber plies used drives the amount of chordwise length where the part is entirely second composite fiber material such as glass. More second composite fiber plies make trailing or leading edge of blade withstand higher strain during a bird impact since the reinforcement fiber material such as glass has higher strain to failure to provide an improved bird-strike capability.

In another embodiment, the second composite fiber plies 30 wrap around trailing edge 29 (shown in FIG. 2) to cover the trailing edge. The second composite fiber plies 30 can have same or similar structure as shown in FIGS. 3, 4 and 5.

Figure 12:
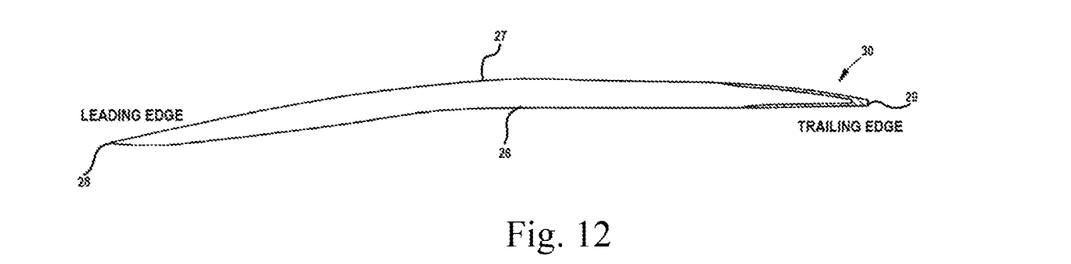
FIG. 12 is an illustrative cross-sectional view of blade according to an embodiment of the invention.
Figure 13:
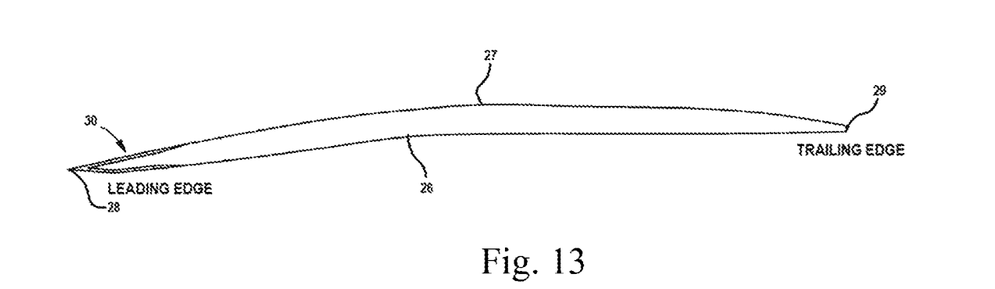
FIG. 13 is an illustrative cross-sectional view of blade according to another embodiment of the invention.
Figure 14:
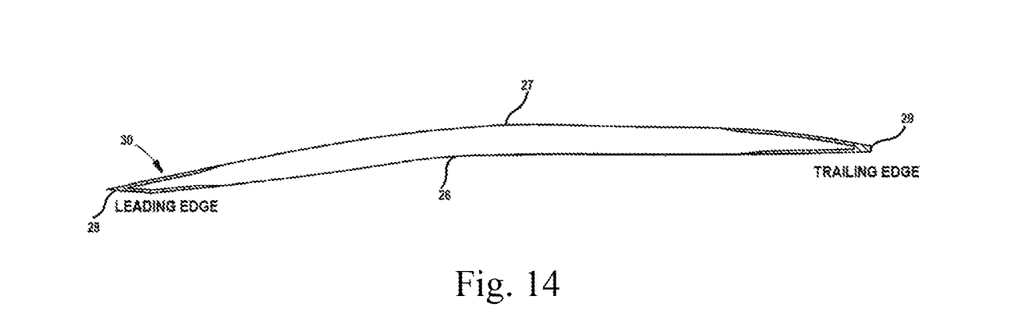
FIG. 14 is an illustrative cross-sectional view of blade according to further embodiment of the invention.

FIGS. 12, 13 and 14 are illustrative cross-sectional views of blade in different embodiments of the invention. As shown in FIG. 12, the second composite fiber plies 30 are disposed at the trailing edge 29 of blade which wrap around the trailing edge. As shown in FIG. 13, the second composite fiber plies 30 are disposed at the leading edge 28 of blade which wrap around the leading edge. As shown in FIG. 14, the second composite fiber plies 30 are disposed at both the leading edge 28 and trailing edge 29 of blade which wrap around both two edges. According to the present disclosure, the second composite fiber plies (i.e. glass fiber) can be disposed at the leading edge, trailing edge or both. But the stiffness of the blade will decrease if the reinforcement glass fiber plies are laid up more while composite carbon fiber layers are laid up less. So, it is not suggested to dispose the reinforcement glass fiber plies throughout the surfaces of the blade.

Figure 15:
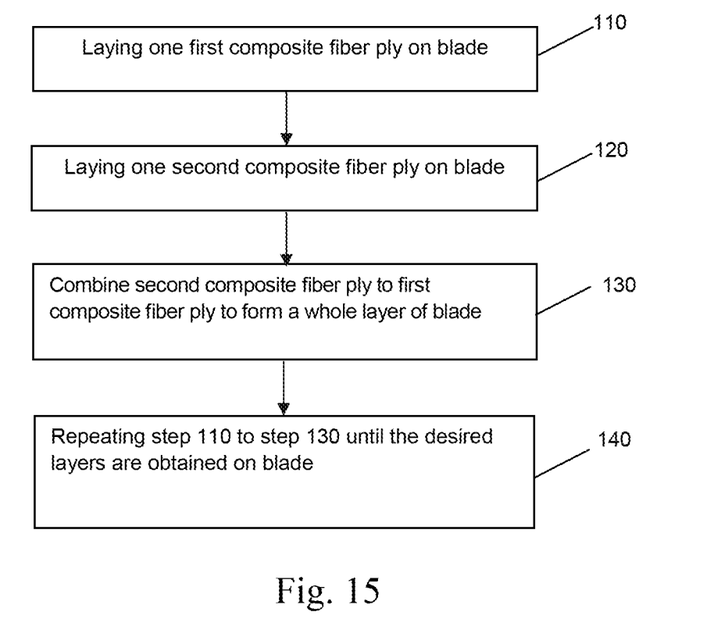
FIG. 15 is a flow chart showing the process of a method of making a blade of the invention.

FIG. 15 shows the process of a method of making a blade according to an embodiment of the invention. In one whole layer of blade, the first composite fiber ply and the second composite fiber ply are two separate pieces, but they are combined together to form one whole layer. As depicted in FIG. 15, laying one first composite fiber ply on the blade 110, and then laying one second composite fiber ply on the blade 120 and combining it to the first composite fiber ply to form a whole layer of blade 130. Each whole layer of the blade including the first composite fiber ply and the second composite fiber ply is laid down before laying the next whole layer, and repeating step 110 to step 130 until the desired layers are obtained on the blade 140. During the process of combining second composite fiber plies to first composite fiber plies, making ends of the second composite fiber plies be staggered (for example, be staggered in both chordwise direction and spanwise direction of the blade) such that interlock between the first composite fiber plies and the second composite fiber plies is formed at a region where the second composite fiber plies end and meet with the first composite fiber plies.

Figure 16:
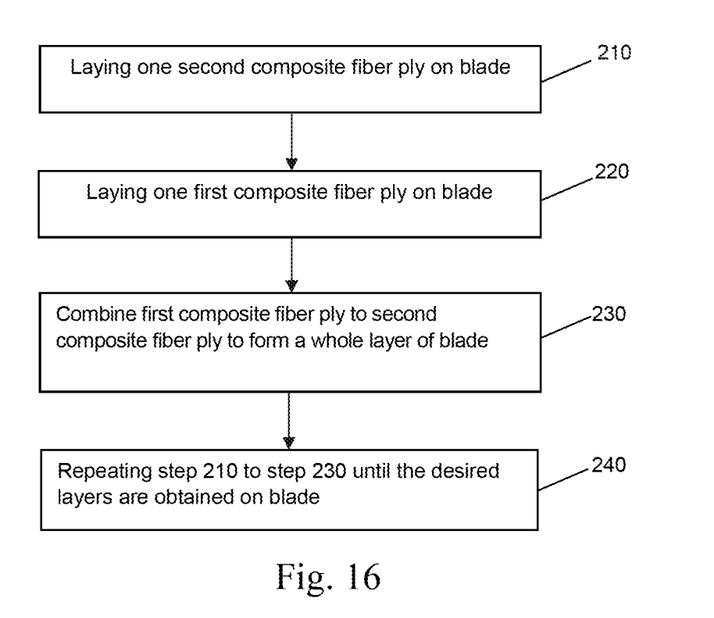
FIG. 16 is another flow chart showing the process of a method of making a blade of the invention.

FIG. 16 shows the process of a method of making a blade according to another embodiment of the invention. Step 110 and step 120 shown in FIG. 15 could be reversed in a contrary sequence in FIG. 16. As depicted in FIG. 16, laying down one second composite fiber ply of the whole layer (i.e. glass fiber ply) on blade first 210, and laying down one first composite fiber ply of the whole layer (i.e. carbon fiber ply) after that 220, and combine them to form a first whole layer of blade 230, and repeating the aforesaid steps to form a subsequent whole layer (i.e. a second whole layer) over the previous whole layer of blade (i.e. the first whole layer) until the anticipated number of whole layers is attained according to the actual requirements 240.

During the processes shown in FIGS. 15 and 16, the blade 20 could be constructed from one side of the blade toward the other side of the blade, or from two sides of the blade simultaneously. The first composite fiber plies and the second composite fiber plies are combined together via any conventional techniques known in the art such as autoclave cure, press cure, resin transfer molding (RTM), vacuum assisted resin transfer molding (VARTM) and so on. It could be understood that the expression of "combine", "combined" and/or "combination" used herein intends to mean first composite fiber plies and second composite fiber plies meet with each other rather than being physically joined together when they are laid down together on the blade.

The thickness of the first composite fiber plies and second composite fiber plies may vary depend on the actual requirements of the blade. Blade represented in the above-mentioned embodiments as well as defined in the claims appended as follows may be incorporated in an engine of an aircraft (i.e. GE9X from General Electric Company).

It could be understood that the second composite fiber plies according the present application could be applied in turbine blade as well. That is, the second composite fiber plies are disposed at the leading edge and/or trailing edge of the turbine blade.

It is known in the art that the carbon composite fibers have high stiffness and high strength. Some blades use the carbon composite fibers be designed in a way that run all the way to the trailing edge and/or leading edge. However, the carbon composite fibers have lower strain to failure compared to glass fibers. Thus, in order to acquire a blade with high stiffness and strength as well as bearing high strain when external load like bird strike is applied on the blade, the present disclosure adopts reinforcement fiber materials such as glass fibers, and reinforcement structure such as the interlock generated transition area in by the staggered ends of the second composite fiber plies in both chordwise direction and spanwise direction of the blade. The glass fibers have a higher strain to failure resulting in an improved birdstrike capability compared to the carbon composite fibers. The chordwise length and spanwise length of reinforcement spanwise glass plies monotonically tapers from the surface inwardly. The chordwise length and spanwise length of reinforcement non-spanwise glass plies do not monotonically increase or monotonically decrease from the surface inwardly. This provides a smooth and robust transition from all carbon to carbon and glass then to all glass. The blade of the present disclosure has the following advantages of 1) having a higher strain to failure at the trailing edge and/or leading edge; 2) allowing the blade to be designed with a reduced thickness and larger chord; and 3) making the machines like engine or aircraft incorporating such engine in a good performance and high efficiency.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A blade comprising:
a plurality of first composite fiber plies; and
a plurality of second composite fiber plies including a plurality of spanwise fiber plies that decrease in both a chordwise length and a spanwise length monotonically from a surface of the blade inwardly, the plurality of second composite fiber plies further including a plurality of non-spanwise fiber plies that do not monotonically decrease or increase in either a chordwise length or a spanwise length from the surface of the blade inwardly;
wherein ends of the plurality of second fiber plies are staggered such that interlock between the first composite fiber plies and the second composite fiber plies is formed in a region where the second composite fiber plies end and meet with the first composite fiber plies.

2. The blade of claim 1, wherein the second composite fiber plies comprise unidirectional fibers.

3. The blade of claim 1, wherein the non-spanwise fiber plies are disposed between adjacent spanwise fiber plies such that the adjacent spanwise fiber plies are spaced by the non-spanwise fiber plies.

4. The blade of claim 3, wherein the plurality of non-spanwise fiber plies each have fibers oriented at an angle between 15° and 75° relative to a spanwise direction of the blade, have fibers oriented at an angle between −75° and −15° relative to the spanwise direction of the blade, or both.

5. The blade of claim 3, wherein the plurality of non-spanwise fiber plies each have fibers oriented at an angle of 45° relative to the spanwise direction of the blade, have fibers oriented at an angle of −45° relative to the spanwise direction of the blade, or both.

6. The blade of claim 1, wherein no more than two plies of a plurality of the second composite fiber plies end at a same spot or at a substantively same spot.

7. The blade of claim 6, wherein no more than two plies of a plurality of the second composite fiber plies ending at the substantively same spot differ within 100 mil.

8. The blade of claim 6, wherein no more than two plies of a plurality of the second composite fiber plies ending at the substantively same spot differ within 20 times of an average thickness of one ply of the second composite fiber plies.

9. The blade of claim 6, wherein at least one ply is disposed between the second composite fiber plies ending at the same spot or at the substantively same spot.

10. The blade of claim 1, wherein chordwise length of each of a plurality of the first composite fiber plies accounts for 50% to 99% of whole chordwise length of the blade and chordwise length of each of a plurality of the second composite fiber plies accounts for 1% to 50% of the whole chordwise length of the blade.

11. The blade of claim 1, wherein a plurality of the first composite fiber plies do not extend to an end of a leading edge, an end of a trailing edge of the blade, or both.

12. The blade of claim 11, wherein edge thickness of the blade is made up of entirely second composite fiber plies accounting for 1% to 50% of the whole chordwise length of the blade.

13. The blade of claim 1, wherein the second composite fiber plies are disposed on a trailing edge, a leading edge of the blade, or both.

14. The blade of claim 1, the second composite fiber plies extend around a trailing edge, a leading edge, or both from a first surface of blade to a second surface of blade.

15. The blade of claim 1, wherein fibers of a plurality of the first composite fiber plies are selected from carbon fibers.

16. The blade of claim 1, wherein fibers of a plurality of the second composite fiber plies are selected from glass, aramid, polymer and basalt fibers.

17. An engine of an aircraft comprising a blade of claim 1.

18. A method of making a blade comprising:
laying a plurality of first composite fiber plies on the blade; and
laying a plurality of second composite fiber plies, the plurality of second composite fiber plies including a plurality of spanwise fiber plies that decrease in both a chordwise length and a spanwise length monotonically from a surface of the blade inwardly, the plurality of second composite fiber plies further including a plurality of non-spanwise fiber plies that do not monotonically decrease or increase in either a chordwise length or a spanwise length from the surface of the blade inwardly, in combination with the plurality of the first composite fiber plies to make ends of the second composite fiber plies be staggered such that interlock between the first composite fiber plies and the second composite fiber plies is formed in a region where the second composite fiber plies end and meet with the first composite fiber plies.

* * * * *